United States Patent [19]

Jacobs et al.

[11] Patent Number: 5,779,533
[45] Date of Patent: Jul. 14, 1998

[54] DEVICE FOR PROCESSING A SLAUGHTERED ANIMAL OR A PART THEREOF

[75] Inventors: Thomas Gerardus Maria Jacobs, Doetinchem; Sander Antonie Van Ochten, Lichtenvoorde; Leonardus Jozephus Antonius Tiggeloven, Groenlo, all of Netherlands

[73] Assignee: Stork R.M.S. B.V., Lichtenvoorde, Netherlands

[21] Appl. No.: 648,211

[22] Filed: May 15, 1996

[51] Int. Cl.$^6$ .................................................. A22B 5/20
[52] U.S. Cl. ......................................................... 452/160
[58] Field of Search ................................. 452/160, 163, 452/152

[56] References Cited

U.S. PATENT DOCUMENTS

| 4,507,822 | 4/1985 | Herubel | 452/160 |
| 4,653,150 | 3/1987 | Leining | 452/160 |
| 4,706,335 | 11/1987 | Schram et al. | 452/163 |

FOREIGN PATENT DOCUMENTS

| 571286 | 4/1988 | Australia. |
| 599780 | 3/1978 | U.S.S.R. ............................ 452/197 |
| WO9301725 | 2/1993 | WIPO. |

*Primary Examiner*—Willis Little
*Attorney, Agent, or Firm*—Webb Ziesenheim Bruening Logsdon Orkin & Hanson, P.C.

[57] ABSTRACT

The invention relates to a device for subjecting to a process a slaughtered and optionally pre-skinned animal, for instance livestock such as a horse, cattle, a pig, a sheep or a part thereof such that said process (also) takes place in a zone where an organ, for instance the preputium, is situated in the wall, for instance the abdominal wall, which device comprises processing means for performing said process. It is an object of the invention to offer provisions with which in simple manner an organ can be preserved from damage by the processing means. With a view hereto the device according to the invention is characterized by displacing means for displacing this organ out of the active zone of the processing means at least during performing of the process at the position of said organ.

12 Claims, 3 Drawing Sheets

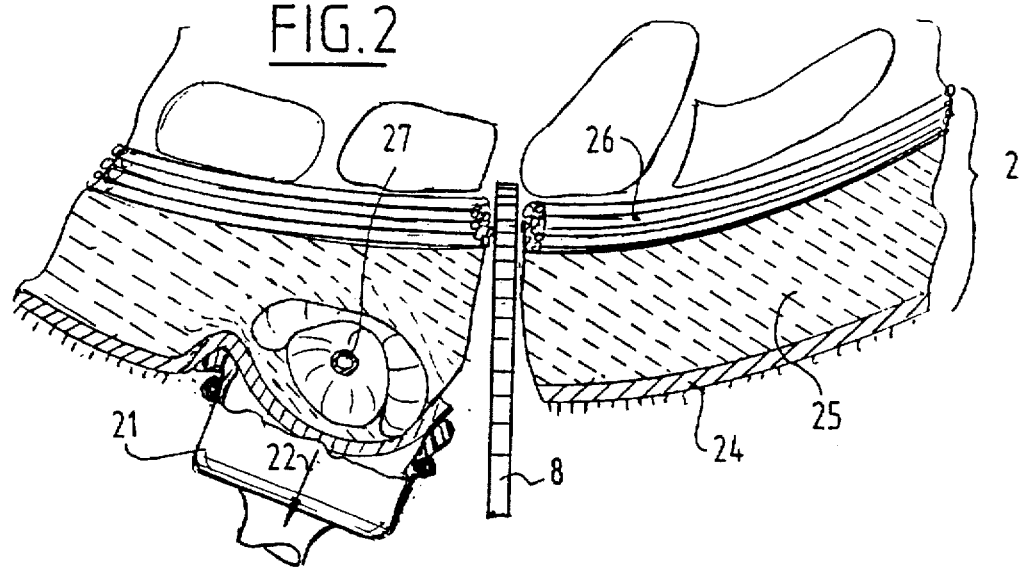
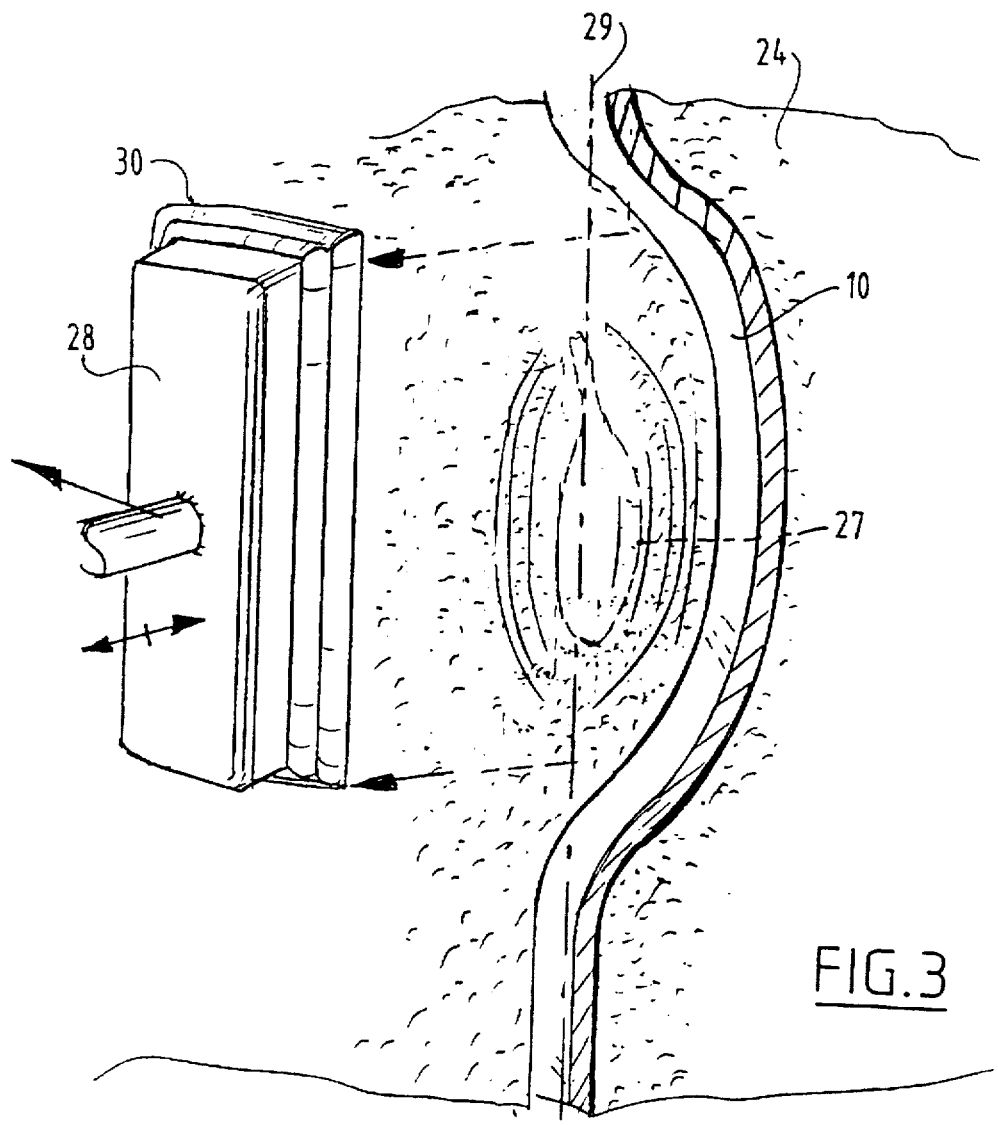

DEVICE FOR PROCESSING A SLAUGHTERED ANIMAL OR A PART THEREOF

FIELD OF THE INVENTION

The invention relates to a device for subjecting to a process a slaughtered and optionally pre-skinned animal, for instance livestock such as a horse, cattle, a pig, a sheep or a part thereof such that said process (also) takes place in a zone where an organ, for instance the preputium, is situated in the wall, for instance the abdominal wall, which device comprises processing means for performing said process.

DESCRIPTION OF THE PRIOR ART

Such a device is known from applicant's international patent application WO-A-93/01725. It is suggested herein that an organ can be avoided by a knife by causing that knife to follow a path round that organ which varies from a straight path. Special provisions for this purpose are necessary in the device which are very difficult to realize in practice and which would make the device relatively costly.

It is an object of the invention to offer provisions with which an organ can be preserved in simple manner from damage by the processing means.

A further object of the invention is to provide simple and inexpensive provisions which can be added to an existing treating device without modifications being necessary to change the path of the processing means.

Another object of the invention is to furnish provisions which in simple manner offer the possibility of preventing undesired co-action between the processing means and the organ, irrespective of the position of this organ.

SUMMARY OF THE INVENTION

The invention relates for instance to a device for cutting through the wall, and thus opening the space located thereunder, of a slaughtered and optionally pre-skinned animal, for instance the abdominal cavity of livestock such as a horse, cattle, a pig, a sheep or a part thereof such that said cutting takes place through a zone where an organ, for instance the preputium, is situated in this wall, which device comprises: cutting means, comprising for instance a knife or a saw, which make a deep incision such that during cutting through of said wall said organ can be damaged.

When for instance a male pig is divided into two parts substantially along the median plane, the problem can occur that the applied cutting tool comes into contact with an organ, in particular the preputium, present in the tissue layers of the abdominal wall such that this organ is cut through at least partially. The moisture released thereafter is generally contaminated with bacteria, which brings about the necessity to cut away the adjoining meat in a further process. This means unnecessary waste and an additional operation.

In the case of a manually operated device, which in principle need only consist of a knife, the organ in question can be cut out beforehand. A cut is also arranged however such that a cutting operation does not take place strictly in the median plane but is deflected in the vicinity of the organ in question. The skin which may still be present, the fatty tissue located thereunder and the muscular tissue located under this fatty tissue are thereby cut asymmetrically. This asymmetry of cutting in the muscular tissue in particular is detrimental.

The invention generally has for its object to perform the process such that the processing means cannot come into unintended contact with said organ, since this can on the one hand possibly disturb the process and on the other damage the organ.

With a view hereto the device according to the invention is characterized by displacing means for displacing this organ out of the active zone of the processing means at least during performing of the process at the position of said organ.

The invention has the particular objective of providing a device of the stated type which can operate automatically without manual control, can make a substantially straight cut through the muscular tissue and effectively prevents the organ in question being cut through by the cutting means, without the organ being cut out in advance.

In respect of the above the device according to the invention is characterized by displacing means for displacing this organ out of the path of the cutting means at least during cutting through of the wall at the position of the above stated organ.

The device can have the particular feature that the displacing means are adapted to displace the organ sideways relative to the path of the cutting means.

A practical embodiment has the special feature that the displacing means are adapted to grip and displace the outer surface of the wall such that said organ is also displaced. It is noted here that the organ in question, in particular the above mentioned preputium, is surrounded by the fatty tissue present between muscular tissue and skin. When the outer surface of the wall is displaced, whereby the adjoining fatty tissue is co-displaced, the underlying muscle layer remains practically in place, thus effectively achieving that the organ is moved out of the path of the cutting means while the muscle layer remains in place. The cut through the muscle layer thus remains practically straight.

Yet another embodiment has the feature that the displacing means comprise a suction opening connectable to a suction pump for gripping and displacing the outer surface of the wall by suction such that said organ is also displaced. In this embodiment a relatively large deviation in the position of the organ is permissible while still retaining the desired certainty that the organ is displaced in the intended manner.

This latter embodiment can be embodied and adapted such that the suction opening is carried to the region of said organ, is sucked fast to the outer surface of the wall, i.e. the skin or, after skinning of an animal, the fatty tissue, to then be displaced sideways while sustaining the suction and carrying along the fatty tissue in which the organ is situated.

Simpler however is a device which has the feature that the suction opening is movable only toward and away from the outer surface of the wall to be subjected to suction. In this embodiment the outer surface of the wall is sucked outward, whereby the surrounding fatty tissue is displaced toward the suction opening, carrying therewith the said organ.

This embodiment does however require that the suction opening be placed comparatively close to the organ.

In order to be less dependent on the actual anatomical proportions of a specific slaughtered animal, a device can be particularly recommended in this latter context which has the feature that the suction opening has an elongate form, the longitudinal direction of which is substantially parallel to the path of the cutting means.

This latter variant can for instance have the special feature that the dimensions of the suction opening amount to $(200\pm100)\times(20\pm15)$ mm.

The device according to the invention with a suction opening as described above can also be applied without problem in an arrangement in which both male and female slaughtered animals are treated. In female animals the skin is stretched more tightly than in male animals, whereby the suction opening does not have the effect there of locally displacing the skin. A straight cut is therefore obtained when cutting takes place along the median plane.

A great flexibility is ensured with an embodiment comprising determining means for determining the position of the organ; and positioning means controlled by these determining means for carrying the displacing means into the region of this position.

A specific embodiment has the feature that the displacing means are embodied mechanically and comprise a clamping and/or pressing member.

A pressing member can for instance be embodied as a plate or strip for pressing into the fatty tissue adjacently of the organ in question, which plate or strip is then displaced sideways, whereby the organ is pressed aside in this direction. A comparable process can take place with clamping means comprising two clamping jaws which grip the organ on either side and which can move the organ out of the path of the cutting means via the surrounding fatty tissue.

As already stated, the device can be applied successfully in the processing of a slaughtered male pig. A device suitable for this purpose can have the feature that the device is adapted to treat a male pig and the displacing means are adapted to displace the part of the sexual organ present in the abdominal wall.

BRIEF DESCRIPTION OF THE DRAWINGS

The invention will once again be elucidated with reference to the annexed drawings. Herein:

FIG. 2 shows the cross section II—II of FIG. 1;

FIG. 3 is a perspective view of an elongate suction nozzle and the associated out;

DESCRIPTION OF THE PREFERRED EMBODIMENTS

Figure 1:
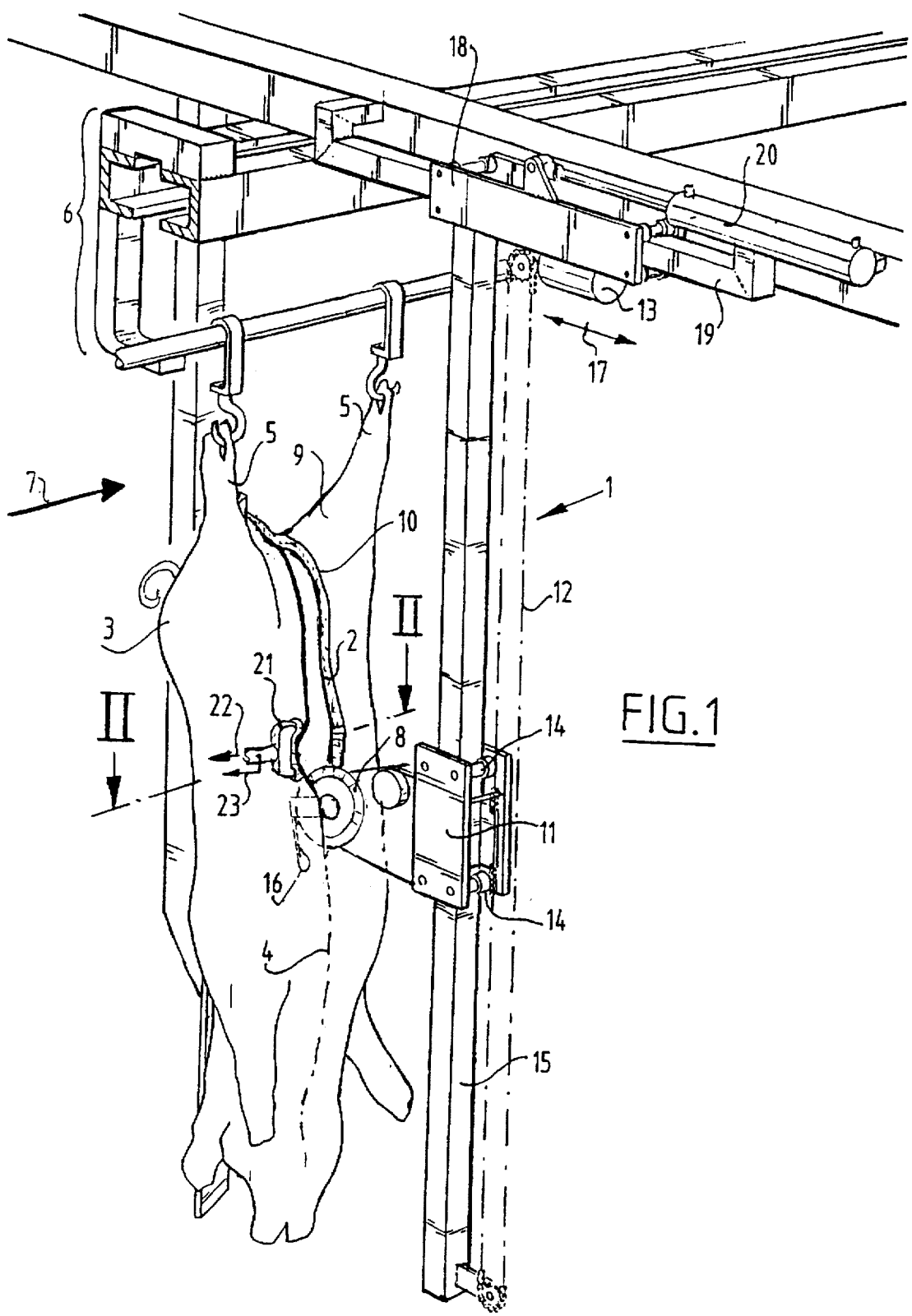
FIG. 1 shows a more or less schematic, perspective view of a device according to the invention.

FIG. 1 shows a device 1 for cutting through the wall 2 consisting of skin, underlying fatty tissue and muscular tissue lying thereunder of a slaughtered male pig 3 and for thus opening the space located thereunder, in this case for instance the abdominal cavity. The cutting operation to be described hereinbelow takes place substantially in the median plane 4 of the pig 3. To this end the pig 3 is suspended from its hind legs 5 on a transporting device 6. At the location of the device 1 according to the invention the transport of the pig according to arrow 7 is in this embodiment temporarily stopped so that a rotatably drivable knife 8 has the opportunity to make a cut 10 from the groin 9 of pig 3 in a downward directed displacement as described above. For this purpose the rotatably drivable knife 8 is supported by a carriage 11 which is movable up and downward via a chain drive 12 under the control of a motor 13. Carriage 11 is provided for this purpose with rollers 14 for rolling co-action with a vertical frame 15. A guide spoon 16 ensures that the penetration depth of the rotatably drivable knife 8 is limited to a chosen value. In addition, the vertical frame 15 is reciprocally movable as according to arrow 17. The frame 15 is supported to this and by the carriage 18 which is rollable over a horizontal rail 19 under the control of a hydraulic cylinder 20 operating as linear motor.

It is noted that the device according to the invention can also be embodied such that during the whole of the cutting operation the device moves along with a transported animal. Thus is prevented that a whole conveyor belt with animals carried thereby must be halted periodically and set into motion again.

In the region of the preputium in placed a suction nozzle 21 which is connected to a source of suction (not shown) and thus can produce a suction action designated symbolically with arrow 22. The suction nozzle is placed in the vicinity of the preputium (not shown) and moved as according to arrow 23 out of the path of the knife 8 in the vertical plane. As a consequence of this sideways movement the preputium is displaced out of this path whereby the knife does not make contact with the preputium FIG. 2 shows that, in the case of this pig 3 which is not skinned beforehand, the wall consists of a skin 24, fatty tissue 25 located thereunder and muscular tissue 26 located thereunder. The organ in question, the preputium 27, is embedded in the fatty tissue 25. Via suction on the skin 24 the suction nozzle 21 pulls the fatty tissue 25 away to the side, taking with it the preputium 27.

FIG. 3 shows an elongate suction nozzle 28, the longitudinal direction of which is substantially parallel to the path 29 of knife 8. Connecting onto suction nozzle 28 in this embodiment is a flexible, for instance rubber, collar 30, thus ensuring a good airtight connection on the skin 24. The situation shown in FIG. 3 is that in which the cut 10 is already made and suction nozzle 28 is retracted, whereby the preputium 27, after being initially displaced sideways, has been re-placed in the median plane in which the path 29 extends.

Figure 4:
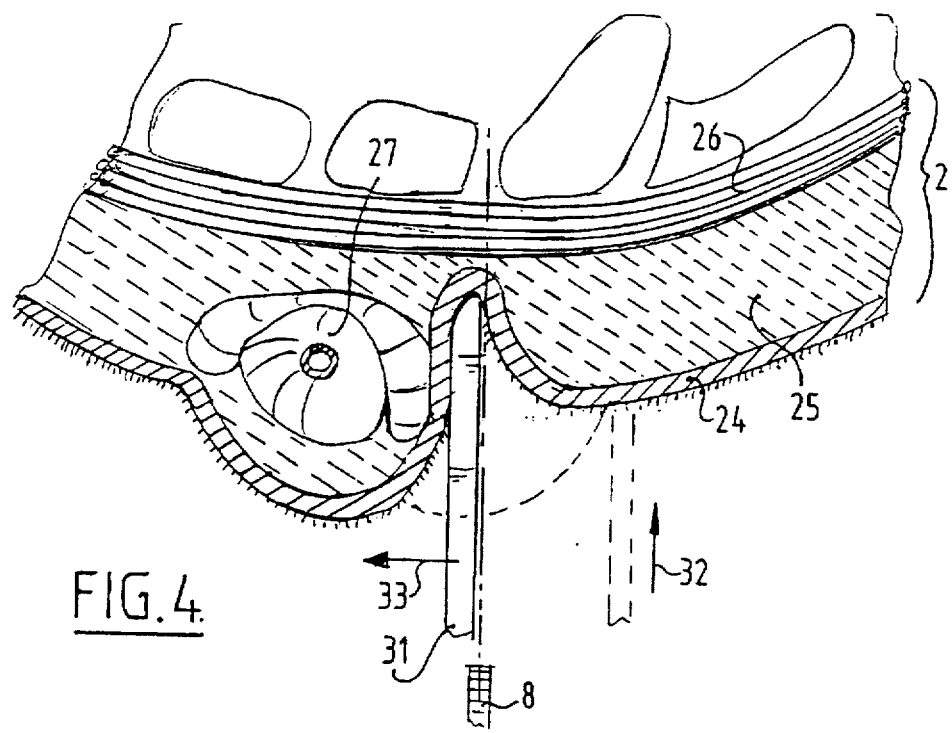
FIG. 4 is a view corresponding with FIG. 2 of a further embodiment.

FIG. 4 shows a variant in which a metal plate 31 is pressed via the skin 24 into the fatty tissue 25 on the right-hand side of the preputium 27. The relevant initial displacement is indicated with arrow 32. After being pressed in sufficiently, the plate 31 is moved to the left as according to arrow 33 whereby a displacement of preputium 27 now also takes place in mechanical manner such that the rotatably drivable knife 8 can cut through the wall 2 without making contact with the preputium.

Figure 5:
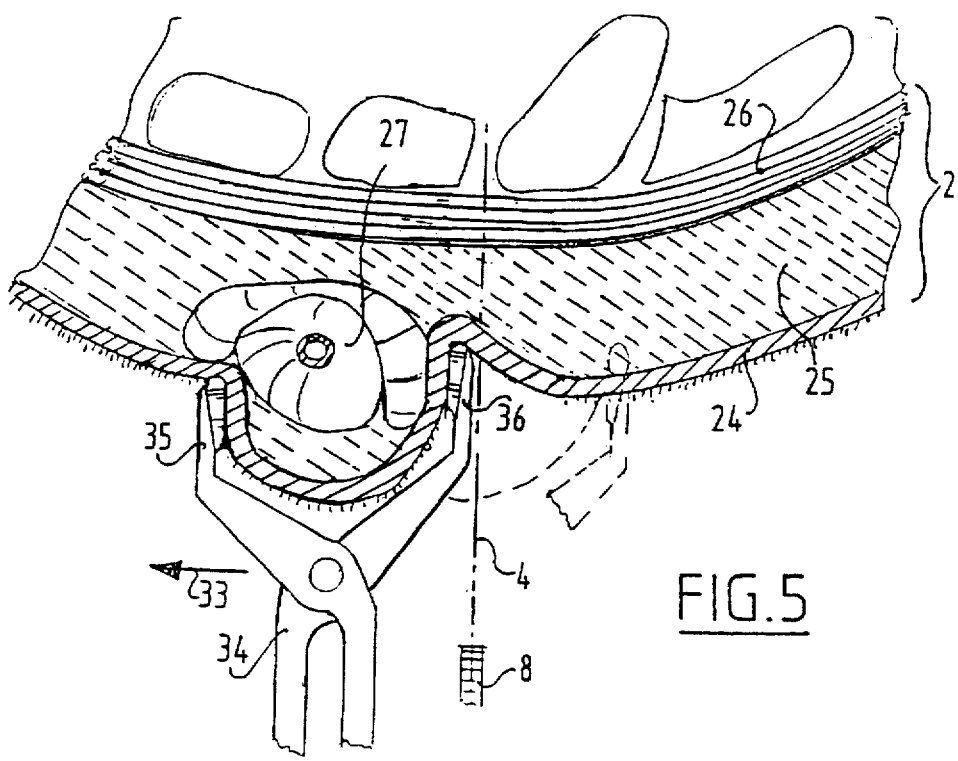
FIG. 5 is a view corresponding with FIG. 2 of a subsequent variant.

Finally, FIG. 5 shows an embodiment in which preputium 27 can be gripped via skin 24 and fatty tissue 25 by means of tongs 34 with respective clamping jaws 35, 36, whereafter preputium 27 is moved out of the median plane 24 by sideways displacement.

We claim:

1. A device for subjecting a slaughtered animal to a process such that said process takes place in a zone where an organ is situated in the tissue, for example the fatty tissue of a wall of the animal, which device comprises:

processing means for performing said process; and displacing means for displacing the organ out of an active zone of the processing means at least during performing of the process at the position of the organ.

2. A device for cutting through a wall, and thus opening the space located thereunder, of a slaughtered animal such that the cutting takes place through a zone where an organ is situated in the tissue, for example the fatty tissue of the wall, which device comprises:

cutting means for cutting through the wall; and displacing means for displacing the organ out of the path of the cutting means at least during cutting through of the wall at the position of the organ.

3. The device as claimed in claim 2, wherein the displacing means are adapted to displace the organ sideways relative to the path of the cutting means.

4. The device as claimed in claim 2, wherein the device is adapted to treat a male pig and the displacing means are adapted to displace the part of the sexual organ present in the abdominal wall.

5. The device as claimed in claim 2, wherein the cutting means includes at least one of a knife and a saw.

6. A device for cutting through a wall, and thus opening the space located thereunder, of a slaughtered animal such that the cutting takes place through a zone where an organ is situated in the wall, which device comprises:

cutting means for cutting through the wall: and displacing means for displacing the organ out of the path of the cutting means at least during cutting through of the wall at the position of the organ, wherein the displacing means are adapted to grip and displace an outer surface of the wall such that the organ is also displaced.

7. The device as claimed in claim 6, wherein the displacing means comprise a suction opening connectable to a suction pump for gripping and displacing the outer surface of the wall by suction such that the organ is also displaced.

8. The device as claimed in claim 7, wherein the suction opening is movable only toward and away from the outer surface of the wall to be subjected to suction.

9. The device as claimed in claim 7, wherein the suction opening has an elongate form, a longitudinal direction of which is substantially parallel to a path of the cutting means.

10. The device as claimed in claim 9, wherein the dimensions of the suction opening are about $(200\pm100)\times(20\pm15)$ mm.

11. The device as claimed in claim 6, wherein the displacing means are embodied mechanically and comprise at least one of a clamping member and a pressing member.

12. A device for subjecting a slaughtered animal to a process such that said process takes place in a zone where an organ is situated in a wall of the animal, which device comprises:

processing means for performing said process;

displacing means for displacing the organ out of an active zone of the processing means at least during performing of the process at the position of the organ;

determining means for determining the position of the organ; and positioning means controlled by the determining means for carrying the displacing means into the region of the position of the organ.

* * * * *

UNITED STATES PATENT AND TRADEMARK OFFICE
CERTIFICATE OF CORRECTION

PATENT NO. : 5,779,533
DATED : July 14, 1998
INVENTOR(S) : Thomas Gerardus Maria Jacobs et al.

It is certified that error appears in the above-identified patent and that said Letters Patent is hereby corrected as shown below:

In the Title Page, insert:
   --[30] Foreign Application Priority Data
   May 17, 1995  [NE]  Netherlands..............1000376--.

Column 3 Line 40 "associated out" should read --associated cut--.

Column 4 Line 12 "in placed" should read --is placed--.

Column 4 Line 51 "plane 24" should read --plane 4--.

Claim 6 Column 5 Line 17 "wall: and" should read --wall; and--.

Signed and Sealed this

Twelfth Day of January, 1999

Attest:

Attesting Officer

*Acting Commissioner of Patents and Trademarks*